United States Patent
Kuo

(10) Patent No.: US 11,340,658 B2
(45) Date of Patent: May 24, 2022

(54) ELECTRONIC DEVICE

(71) Applicant: Acer Incorporated, New Taipei (TW)

(72) Inventor: Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 71 days.

(21) Appl. No.: 16/941,554

(22) Filed: Jul. 29, 2020

(65) Prior Publication Data

US 2021/0191473 A1    Jun. 24, 2021

(30) Foreign Application Priority Data

Dec. 24, 2019  (TW) .................................. 108217147

(51) Int. Cl.
*G06F 1/16* (2006.01)
*G06F 3/0354* (2013.01)

(52) U.S. Cl.
CPC .......... *G06F 1/1656* (2013.01); *G06F 1/1643* (2013.01); *G06F 3/03545* (2013.01)

(58) Field of Classification Search
CPC .... G06F 1/1626; G06F 1/1643; G06F 1/1656; G06F 3/03545; G06F 2200/1632
See application file for complete search history.

(56) References Cited

U.S. PATENT DOCUMENTS

| | | | | |
|---|---|---|---|---|
| 10,031,557 | B1* | 7/2018 | Morrison | G06F 1/266 |
| 10,824,254 | B1* | 11/2020 | Bikumala | H02J 7/34 |
| 2017/0108952 | A1* | 4/2017 | Tang | G06F 3/03545 |
| 2019/0346881 | A1* | 11/2019 | Chai | G06F 1/1681 |
| 2020/0174529 | A1* | 6/2020 | Goh | G06F 1/1643 |
| 2020/0201396 | A1* | 6/2020 | Meng | G06F 1/1626 |
| 2021/0099025 | A1* | 4/2021 | Gaule | H02J 7/0042 |

FOREIGN PATENT DOCUMENTS

| | | |
|---|---|---|
| CN | 101311873 | 11/2008 |
| TW | M579310 | 6/2019 |

* cited by examiner

*Primary Examiner* — Anthony Q Edwards
(74) *Attorney, Agent, or Firm* — JCIPRNET

(57) ABSTRACT

An electronic device includes a casing, a stylus, a first magnet, and a pair of second magnets. The casing has a surface and an accommodation groove recessed from the surface. The accommodation groove has an accommodation portion parallel to the surface and a pair of connection portions obliquely connected between the surface and the accommodation portion. The stylus has a front end and a rear end, and the first magnet is disposed at the rear end. The second magnets are disposed in the casing and located below the accommodation portion.

7 Claims, 3 Drawing Sheets

ELECTRONIC DEVICE

CROSS-REFERENCE TO RELATED APPLICATION

This application claims the priority benefit of Taiwan patent application serial no. 108217147, filed on Dec. 24, 2019. The entirety of the above-mentioned patent application is hereby incorporated by reference here and made a part of this specification.

BACKGROUND

Technical Field

The disclosure relates to an electronic device, and more particularly, to an electronic device which allows a user to easily pick up and place a stylus.

Description of Related Art

With the development of science and technology, a touch screen has been widely used in an existing notebook computer, and a stylus may assist a user in accurately writing, making notes, or drawing on the touch screen, and therefore the stylus is an indispensable auxiliary tool for the touch screen.

The portability of the notebook computer allows the user to frequently bring the notebook computer with him or her. To prevent the stylus from being lost, the notebook computer is often designed to be equipped with an accommodation groove for accommodating the stylus, and the stylus is stored in the accommodation groove.

SUMMARY

The disclosure provides an electronic device which allows a user to easily pick up and place a stylus.

According to an embodiment of the disclosure, an electronic device includes a casing, a stylus, a first magnet, and a pair of second magnets. The casing has a surface and an accommodation groove recessed from the surface. The accommodation groove has an accommodation portion parallel to the surface and a pair of connection portions obliquely connected between the surface and the accommodation portion. The stylus has a front end and a rear end, and the first magnet is disposed at the rear end. The pair of second magnets is disposed in the casing and located below the accommodation portion.

In an embodiment of the disclosure, in a first section, the accommodation portion is parallel to the surface, and the pair of connection portions is inclined toward the surface by an angle of 20 degrees to 30 degrees compared to the accommodation portion.

In an embodiment of the disclosure, in a second section, the accommodation portion conforms to the stylus.

In an embodiment of the disclosure, the accommodation groove has a symmetrical structure.

In an embodiment of the disclosure, the pair of second magnets is symmetrically spaced from each other.

In an embodiment of the disclosure, a place where the accommodation portion and the pair of connection portions is connected is a connected turning point, and the pair of second magnets is separated from the connected turning point by a distance.

In an embodiment of the disclosure, magnetic poles of the first magnet are arranged along a horizontal direction, and the magnetic poles of the pair of second magnets are arranged along a vertical direction. The magnetic poles of the first magnet and the magnetic poles of the pair of second magnets which are close to the magnetic poles of the first magnet are different from each other and attracted to each other.

Based on the above, in the electronic device provided one or more embodiments of the disclosure, the arrangement of the first magnet and the second magnet allows the stylus to arrive at the predetermined locations due to the magnetic attraction of the first magnet and the second magnet, and the user can easily pick up the stylus from the accommodation groove due to the magnetic repulsion of the first magnet and the second magnet.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
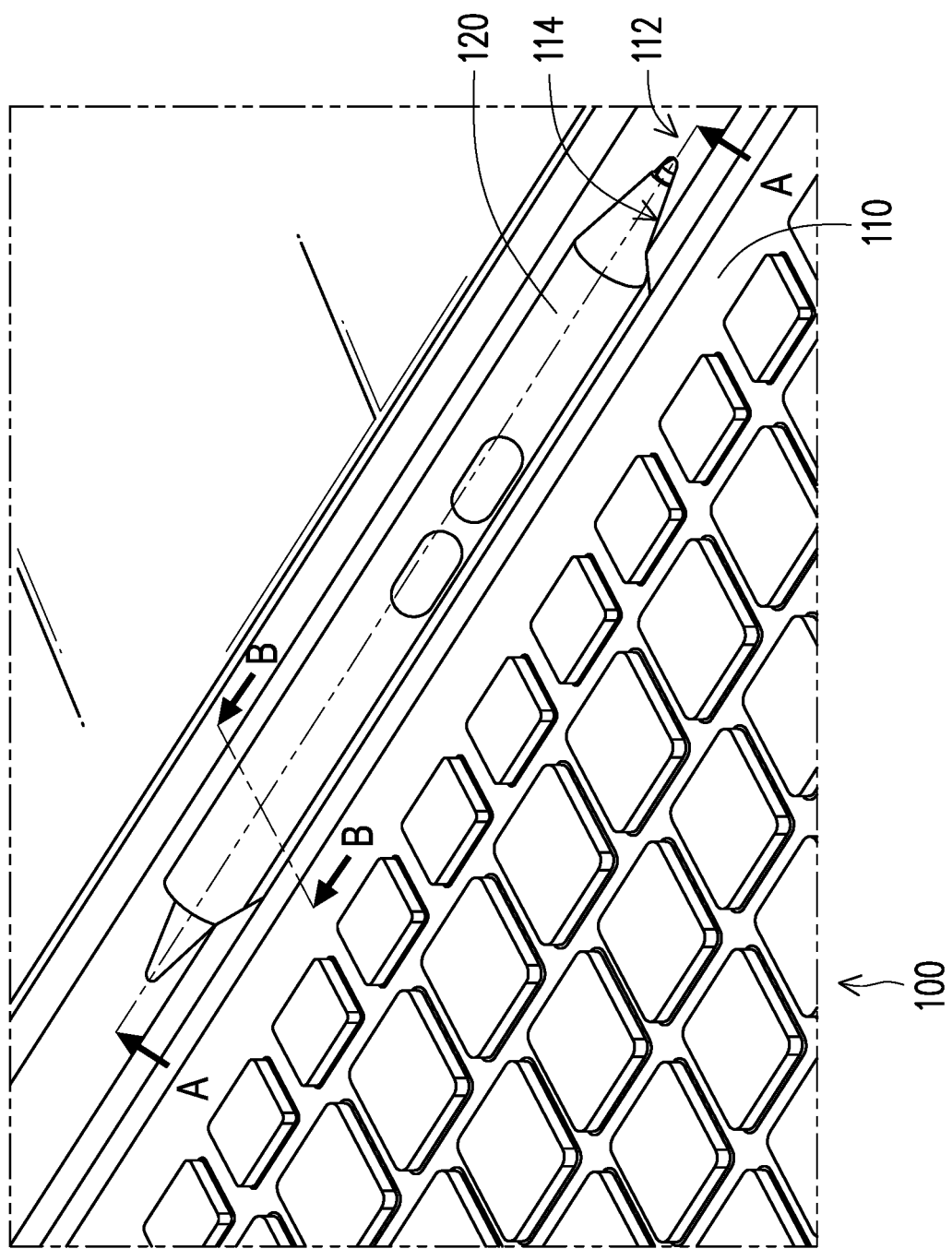
FIG. 1 is a schematic partial view of an electronic device according to an embodiment of the disclosure.
Figure 2:
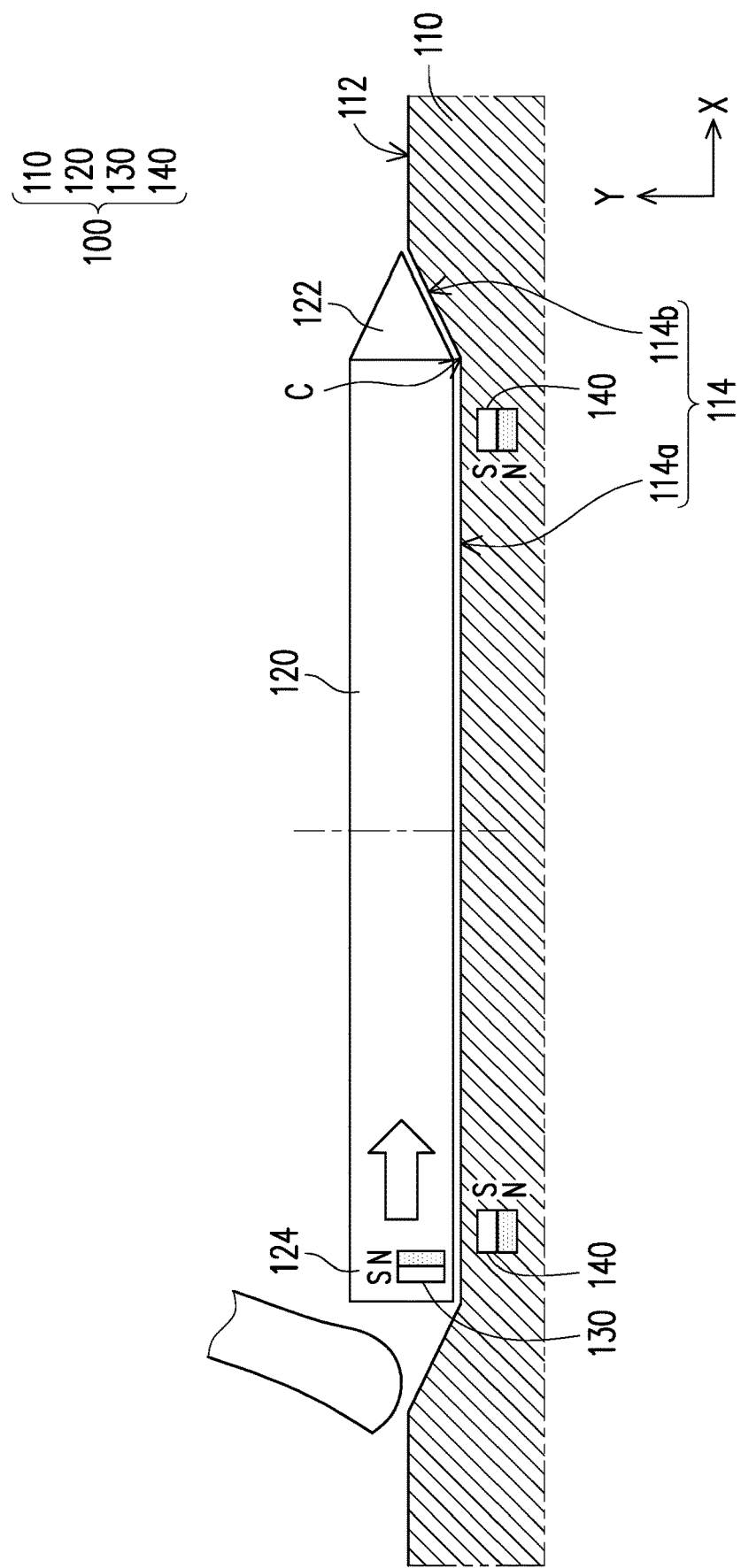
FIG. 2 is a cross-sectional view taken along an A-A sectional line in FIG. 1.
Figure 3:
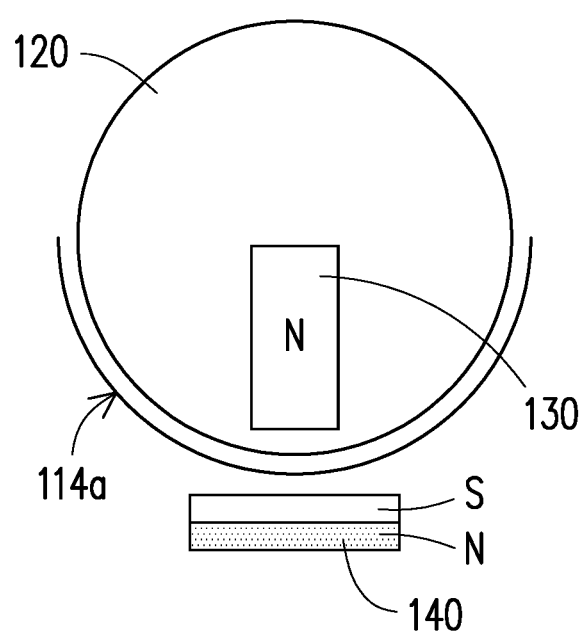
FIG. 3 is a schematic cross-sectional view taken along a B-B sectional line in FIG. 1.

FIG. 1 is a schematic partial view of an electronic device according to an embodiment of the disclosure, where a stylus is placed in an accommodation groove of a casing. FIG. 2 is a cross-sectional view taken along an A-A sectional line in FIG. 1, and FIG. 3 is a schematic cross-sectional view taken along a B-B sectional line in FIG. 1. With reference to FIG. 1, FIG. 2, and FIG. 3, an electronic device 100 provided in an embodiment of the disclosure is a notebook computer and includes a casing 110, a stylus 120, a first magnet 130, and a pair of second magnets 140.

A material of the casing 110 may be plastic, and the casing 110 has a surface 112 and an accommodation groove 114 recessed from the surface 112. In this embodiment, the accommodation groove 114 has a symmetrical structure. Specifically, in a first section along the A-A sectional line, the accommodation groove 114 has an accommodation portion 114a parallel to the surface 112 and a pair of connection portions 114b obliquely connected between the surface 112 and the accommodation portion 114a, and the pair of connection portions 114b is inclined toward the surface 112 by 20 degrees to 30 degrees compared to the accommodation portion 114a. Therefore, the connection portions 114b are inclined planes in the first section.

The accommodation groove 114 is arc-shaped in the second section along the B-B sectional line and conforms to the stylus 120, so as to well accommodate the stylus 120. Certainly, if the shape of the stylus 120 is changed, the shape of the accommodation groove 114 may correspondingly change.

The stylus 120 has a front end 122 and a rear end 124. The first magnet 130 is disposed at the rear end 124 of the stylus 120. As shown in FIG. 2, the front end 122 of the stylus 120 is on the right side, and the rear end 124 of the stylus 120 is on the left side.

As shown in FIG. 1, FIG. 2 and FIG. 3, the pair of second magnets 140 is symmetrically spaced from each other in the casing 110 and is located below the accommodation portion 114a. Specifically, the pair of second magnets 140 is fixed below two opposite sides of the accommodation portion 114a (close to the connection portions 114b, respectively), and in a horizontal direction X, the pair of second magnets 140 is separated from a connected turning point C where the accommodation portion 114a and the pair of connection portions 114b is connected by a distance. In addition, the distance between the two second magnets 140 needs to be long enough to ensure that the magnetic fields of the pair of second magnets 140 do not affect each other.

Magnetic poles of the first magnet 130 are arranged along the horizontal direction X. Specifically, along the horizontal direction X (i.e., an axial direction of the stylus 120 when the stylus 120 is placed in the accommodation groove 114), the magnetic poles of the first magnet 130 are arranged as S-pole and N-pole from the left side to the right side of the accommodation groove 114.

The magnetic poles of the second magnet 140 are arranged along a vertical direction Y, wherein the vertical direction Y is perpendicular to the axial direction of the stylus 120 when the stylus 120 is placed in the accommodation groove 114. As shown in FIG. 2, from above to below the surface 112 of the casing 110, the magnetic poles of the second magnet 140 are arranged as S-pole and N-pole. In other words, the S-pole of the second magnet 140 is located above the N-pole.

When the position of the magnetic poles of one of the first magnet 130 and the second magnet 140 is changed, note that the position of the magnetic poles of the other of the first magnet 130 and the second magnet 140 is changed accordingly.

The magnetic attraction between the second magnet 140 and the first magnet 130 allows the stylus 120 randomly placed in the accommodation groove 114 to be guided to the correct position in the accommodation groove 114 for storage.

Specifically, when a user places the stylus 120 into the accommodation groove 114, since the accommodation groove 114 has a symmetrical structure, the user need not intentionally adjust the direction of the front end 122 of the stylus 120 (i.e., whether the front end 122 is located at the left side or the right side); instead, the stylus 120 may be discretionarily placed in the accommodation groove 114.

At this time, since the connection portions 114b are inclined planes obliquely connected between the accommodation portion 114a and the surface 112 of the casing 110, the connection portions 114b may initially guide the stylus 120 to slide into the accommodation portion 114a through the contact with the front end 122 of the stylus 120.

Specifically, when the rear end 124 of the stylus 120 gradually slides into the accommodation portion 114a of the accommodation groove 114, the second magnet 140 is placed below both sides of the accommodation portion 114a, and since the S-pole of the second magnet 140 is located on the top of the second magnet 140 and is attracted to the N-pole of the first magnet 130, the stylus 120 is further guided to the correct position in the accommodation groove 114.

At the same time, owing to the attraction of the second magnet 140 and the first magnet 130, the stylus 120 is fixed into the accommodation groove 114 through magnetic attraction.

As shown in the embodiments of FIG. 1 and FIG. 2, the front end 122 of the stylus 120 is located on the right side of the drawings; however, due to the symmetrical structure of the accommodation groove 114, it is likely to place the front end 122 of the stylus 120 on the left side of the drawings to place the stylus 120 in the accommodation groove 114, and the same effects may be achieved.

When the user intends to pick up the stylus 120 from the accommodation groove 114, since the connection portions 114b of the accommodation groove 114 are inclined planes, the connection portions 114b at the rear end 124 of the stylus 120 form a gap, and the user is able to flip the rear end 124 of the stylus 120 by his or her finger passing through the gap and exert a force to the stylus 120, so as to move the stylus 120 toward the direction of the front end 122 (the right side). Here, the force is greater than the attraction of the first magnet 130 and the second magnet 140.

At this time, the front end 122 of the stylus 120 is raised up while it is moved toward the right by the connection portions 114b. As the stylus 120 is moved toward the right, the N-pole of the first magnet 130 leaves the magnetic domain of the S-pole of the second magnet 140, and the S-pole of the first magnet 130 enters the magnetic domain of the S-pole of the second magnet 140; therefore, the S-pole of the first magnet 130 and the S-pole of the second magnet 140 are magnetically repulsive, and then the stylus 120 is pushed up and may be popped out of the accommodation groove 114, so the user is able to easily pick up the stylus 120.

The above descriptions about the orientations or directions, such as up, down, left, right, front, and rear, are provided according to the drawings and relative to the benchmark. Those of ordinary knowledge should know that the descriptions about the orientations or directions may be changed if the benchmark is changed.

To sum up, in the electronic device provided in one or more embodiments of the disclosure, the arrangement of the first magnet and the second magnet and the arrangement of the accommodation groove having the symmetrical structure allow the stylus to arrive at the predetermined location in the accommodation groove due to the magnetic attraction of the first magnet and the second magnet. Besides, due to the magnetic repulsion of the first magnet and the second magnet, the stylus is pushed out of the accommodation groove, so that the user may conveniently store the stylus in the accommodation groove or pick up the stylus from the accommodation groove.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a casing, having a surface and an accommodation groove recessed from the surface, wherein the accommodation groove has an accommodation portion and a pair of connection portions obliquely connected between the surface and the accommodation portion;
   a stylus, having a front end and a rear end;
   a first magnet, disposed at the rear end of the stylus; and a pair of second magnets, disposed in the casing and located below the accommodation portion,
wherein magnetic poles of the first magnet are arranged along a horizontal direction, and the magnetic poles of the pair of second magnets are arranged along a vertical direction.

2. The electronic device according to claim 1, wherein in a first section, the accommodation portion is parallel to the surface, and the pair of connection portions is inclined toward the surface by an angle of 20 degrees to 30 degrees compared to the accommodation portion.

3. The electronic device according to claim 1, wherein in a second section, the accommodation portion conforms to the stylus.

4. The electronic device according to claim 1, wherein the accommodation groove has a symmetrical structure.

5. The electronic device according to claim 1, wherein the pair of second magnets is symmetrically spaced from each other.

6. The electronic device according to claim 1, wherein a place where the accommodation portion and the pair of connection portions is connected is a connected turning point, and the pair of second magnets is separated from the connected turning point by a distance.

7. The electronic device according to claim 1, wherein the magnetic poles of the first magnet and the magnetic poles of the pair of second magnets which are close to the magnetic poles of the first magnet are different from each other and attracted to each other.

\* \* \* \* \*